(12) United States Patent
Lee et al.

(10) Patent No.: US 10,529,983 B2
(45) Date of Patent: Jan. 7, 2020

(54) COMPOSITE ELECTRODE ACTIVE MATERIAL, LITHIUM BATTERY INCLUDING THE SAME, AND METHOD OF PREPARING THE COMPOSITE ELECTRODE ACTIVE MATERIAL

(71) Applicants: Samsung Electronics Co., Ltd., Suwon-si, Gyeonggi-do (KR); Samsung SDI Co., Ltd., Yongin-si, Gyeonggi-do (KR); Seoul National University R&DB Foundation, Seoul (KR)

(72) Inventors: Kanghee Lee, Suwon-si (KR); Byoungsun Lee, Seoul (KR); Woongryeol Yu, Seoul (KR); Sungsoo Han, Hwaseong-si (KR); Hosung Yang, Busan (KR); Jihyun Yoon, Anyang-si (KR)

(73) Assignees: Samsung Electronics Co., LTD., Gyeonggi-Do (KR); SAMSUNG SDI CO., LTD., Gyeonggi-Do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 260 days.

(21) Appl. No.: 15/398,016

(22) Filed: Jan. 4, 2017

(65) Prior Publication Data

US 2018/0006297 A1    Jan. 4, 2018

(30) Foreign Application Priority Data

Jul. 4, 2016    (KR) .................. 10-2016-0084093

(51) Int. Cl.
*H01M 4/36*    (2006.01)
*H01M 4/38*    (2006.01)
(Continued)

(52) U.S. Cl.
CPC .............. *H01M 4/362* (2013.01); *C01B 32/15* (2017.08); *H01M 4/386* (2013.01); *H01M 4/387* (2013.01);
(Continued)

(58) Field of Classification Search
CPC .............. C01B 32/15; H01M 10/0525; H01M 2004/027; H01M 4/362; H01M 4/364;
(Continued)

(56) References Cited

U.S. PATENT DOCUMENTS 8,182,939 B2    5/2012    Kim et al.
8,263,262 B2    9/2012    Kim et al.
(Continued)

FOREIGN PATENT DOCUMENTS

| KR | 10-0776912 B1 | 11/2007 |
| KR | 10-0938058 B1 | 1/2010 |
| KR | 10201301409785 A | 10/2013 |

OTHER PUBLICATIONS

Lee et al., "Fabrication of Si core/C shell nanofibers and their electrochemical performances as a lithium-ion battery anode", Journal of Power Sources, 2012, 206, pp. 267-273.
(Continued)

*Primary Examiner* — Lingwen R Zeng
(74) *Attorney, Agent, or Firm* — Cantor Colburn LLP

(57) ABSTRACT

A composite electrode active material includes: a carbon nanostructure shell; a first core material disposed in a first pore channel of the carbon nanostructure shell; and a second core material disposed in a second pore channel of the carbon nanostructure shell, wherein the first core material includes a first electrode active material and the second core material includes a second electrode active material, and wherein the first electrode active material has a Li+/Li charge/discharge voltage potential which is different from a
(Continued)

Li+/Li charge/discharge voltage potential of the second electrode active material.

25 Claims, 14 Drawing Sheets

(51) Int. Cl.
*H01M 10/0525* (2010.01)
*H01M 4/02* (2006.01)
*C01B 32/15* (2017.01)
*H01M 4/62* (2006.01)

(52) U.S. Cl.
CPC ....... *H01M 4/625* (2013.01); *H01M 10/0525* (2013.01); *H01M 4/364* (2013.01); *H01M 4/366* (2013.01); *H01M 2004/027* (2013.01)

(58) Field of Classification Search
CPC ...... H01M 4/366; H01M 4/386; H01M 4/387; H01M 4/625
See application file for complete search history.

(56) References Cited

U.S. PATENT DOCUMENTS

| | | | |
|---|---|---|---|
| 2009/0305135 A1* | 12/2009 | Shi | B82Y 30/00 429/217 |
| 2011/0311873 A1 | 12/2011 | Schulz et al. | |
| 2012/0202112 A1 | 8/2012 | Yushin et al. | |
| 2013/0260252 A1 | 10/2013 | Sheem et al. | |
| 2015/0099185 A1* | 4/2015 | Joo | D01D 5/003 429/231.8 |

OTHER PUBLICATIONS

Lee et al., "Facile conductive bridges formed between silicon nanoparticles inside hollow carbon nanofibers", Nanoscale, 2013, 5, pp. 4790-4796.

Lee et al., "Novel multi-layered 1-D nanostructure exhibiting the theoretical capacity of silicon for a super-enhanced lithium-ion battery", Nanoscale, 2014, 6, pp. 5989-5998.

Yang et al., "Fabrication of carbon nanofibers with Si nanoparticle-stuffed cylindrical multi-channels via coaxial electrospinning and their anodic performance", RSC Advances, 2014, 4, pp. 47389-47395.

* cited by examiner

US 10,529,983 B2

COMPOSITE ELECTRODE ACTIVE MATERIAL, LITHIUM BATTERY INCLUDING THE SAME, AND METHOD OF PREPARING THE COMPOSITE ELECTRODE ACTIVE MATERIAL

CROSS-REFERENCE TO RELATED APPLICATION

This application claims priority to and the benefit of Korean Patent Application No. 10-2016-0084093, filed on Jul. 4, 2016, in the Korean Intellectual Property Office, and all the benefits accruing therefrom under 35 U.S.C. § 119, the content of which is incorporated herein in its entirety by reference.

BACKGROUND

1. Field

The present disclosure relates to a composite electrode active material, a lithium battery including the same, and methods of preparing the composite electrode active material.

2. Description of the Related Art

Silicon has been widely used as an electrode active material in lithium batteries, for example, lithium secondary batteries, due to the high capacity (theoretical capacity of about 3,570 mAh/g at room temperature) of the material. However, the volumetric expansion of silicon which may occur during intercalation and deintercalation of lithium ions may be as much as 300%.

The volumetric expansion of silicon may cause a mechanical strain leading to the pulverization of silicon and difficulty in controlling a solid electrolyte interphase (SEI) layer. Thus, a lithium battery including silicon as an electrode active material may experience rapid deterioration of its charge/discharge characteristics, such as rate properties and lifespan characteristics.

Therefore, there remains a need to develop an improved composite electrode active material, a lithium battery including the same, and methods of preparing the composite electrode active material.

SUMMARY

Provided is a composite electrode active material having excellent charge/discharge characteristics.

Provided is a lithium battery including the composite electrode active material.

Provided is a method of preparing the composite electrode active material.

According to an aspect of an embodiment, a composite electrode active material includes: a carbon nanostructure shell; a first core material disposed in a first pore channel of the carbon nanostructure shell; and a second core material disposed in a second pore channel of the carbon nanostructure shell, wherein the first core material comprises a first electrode active material and the second core material comprises a second electrode active material, and wherein the first electrode active material has a Li+/Li charge/discharge voltage potential which is different from a Li+/Li charge/discharge voltage potential of the second electrode active material.

According to an aspect of another embodiment, a lithium battery includes: a cathode; an anode including a composite electrode active material; and an electrolyte disposed between the cathode and the anode; wherein the composite electrode active material includes: a carbon nanostructure shell; a first core material disposed in a first pore channel of the carbon nanostructure shell; and a second core material disposed in a second pore channel of the carbon nanostructure shell, wherein the first core material includes a first electrode active material and the second core material includes a second electrode active material, and wherein the first electrode active material has a Li+/Li charge/discharge voltage potential which is different from a Li+/Li charge/discharge voltage potential of the second electrode active material.

According to an aspect of another embodiment, a method of preparing a composite electrode active material includes: preparing a carbon nanostructure shell precursor solution; preparing a first sacrificial material-electrode active material core solution by mixing a sacrificial material with a first electrode active material solution including a first electrode active material; preparing a second sacrificial material-electrode active material core solution by mixing the sacrificial material solution with a second electrode active material solution comprising a second electrode active material; supplying the carbon nanostructure shell precursor solution, the first sacrificial material-electrode active material core solution, and the second sacrificial material-electrode active material core solution into an electrospinning apparatus and heat-treating the mixture to prepare the composite electrode active material, wherein the composite electrode material includes: a carbon nanostructure shell; a first core material disposed in a first pore channel of the carbon nanostructure shell; and a second core material disposed in a second pore channel of the carbon nanostructure shell, wherein the first core material includes the first electrode active material and the second core material includes the second electrode active material.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which:

FIGS. 4A to 4D are energy dispersive spectroscopy (EDS) images of structure of the composite electrode active material according to Example 1, in which FIG. 4A shows the entire structure of the composite active material, FIG. 4B is a photograph which shows the position of tin (Sn), FIG. 4C is a photograph which shows the position of silicon (Si), and FIG. 4D is a photograph which shows the position of carbon (C), in the composite electrode active material;

DETAILED DESCRIPTION

Figure 1A:
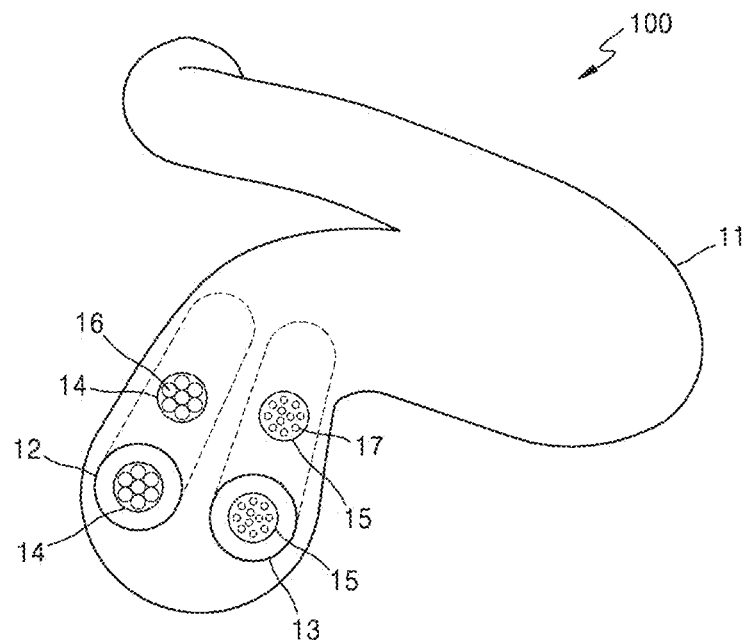
FIG. 1A is a schematic diagram illustrating a structure of a composite electrode active material, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. Expressions such as "at least one of," when preceding a list of elements, modify the entire list of elements and do not modify the individual elements of the list. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a composite electrode active material, a lithium battery including the same, and a method of preparing the composite electrode active material according to an embodiment will be described in detail with reference to the accompanying drawings.

As used herein, the term "a combination thereof" is used to indicate a mixture and/or combination of two or more components.

As used herein, "acryl" includes acrylic, methacrylic, acrylamide, methacrylamide, (C1 to C20 alkyl) acrylate, and (C1 to C20 alkyl) methacrylate. An "acryl" polymer includes any polymer derived from polymerization of an acryl or a methacryl monomer, e.g., acrylonitrile, methacrylonitrile, acrylamide, methacrylamide, acrylic acid, methacrylic acid, or an ester of acrylic or methacrylic acid.

Composite Electrode Active Material

Figure 1B:
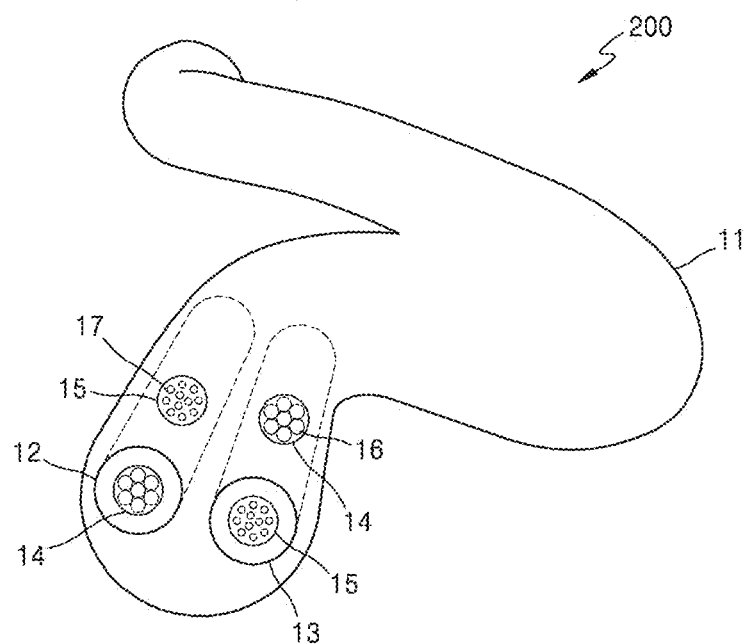
FIG. 1B is a schematic diagram illustrating a structure of a composite electrode active material, according to another embodiment.
Figure 2:
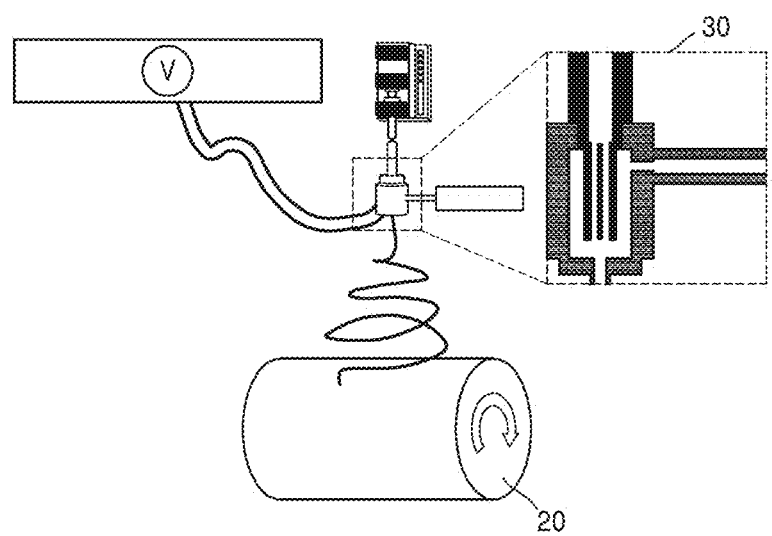
FIG. 2 is a schematic diagram illustrating an electrospinning apparatus, according to an embodiment.

FIGS. 1A and 1B are each a schematic diagram illustrating a structure of a composite electrode active material according to an embodiment.

Referring to FIG. 1A, the composite electrode active material 100 according to an embodiment includes: a carbon nanostructure shell 11; and at least a first pore channel 12 and a second pore channel 13 in the carbon nanostructure shell 11. The first and second pore channels 12 and 13 may each independently include at least one core material, such as a first core material 14 and a second core material 15. The first core material 14 comprises an electrode active material, such as first electrode active material 16. Also, the second core material 15 comprises an electrode active material, such as second electrode active material 17. Thus the first and second electrode active materials may each independently be disposed in the first core material 14 and the second core material 15. Also, and the first and second electrode active materials 16 and 17 have different charge/discharge voltage potential with respect to $Li^+/Li$. The pore channels comprising the cores which comprise the electrode active materials are defined in the carbon nanostructure shell 11. Thus, the composite electrode active material includes at least two pore channels, each including a core. Shown in FIG. 1A is as embodiment of the composite electrode active material 100 in which the first pore channel 12 comprises the first core material 14 and the second pore channel comprises the second core material 15, and wherein the first core material 14 comprises the first electrode active material 16 and the second core material 15 comprises the second electrode active material 17. Shown in FIG. 1B is an embodiment of the composite electrode active material 200 in which the first pore channel 12 and the second pore channel 13 each comprise the first core material 14 and the second core material 15.

Since the at least two pore channels comprise at least one electrode active material, such as first and second electrode active materials 16 and 17, and the electrode active materials each have different charge/discharge voltage potentials with respect to $Li^+/Li$, the composite electrode active material may have increased control of the pores and charging and discharging and may be designed to proceed in multiple voltages. Thus, electrochemical reactions may be dispersed. Due to the dispersion of the electrochemical reactions in the composite electrode active material, the composite electrode active material may have improved durability, and accordingly, a lithium battery including the same may also have excellent charge/discharge characteristics such as rate properties and lifespan characteristics.

The composite electrode active material 100 shown in FIG. 1A and the composite electrode active material 200 shown in FIG. 1B each include two pore channels. However, the composite electrode active material is not limited to only two pore channels, and may include any additional number of pore channels. Also, although two types of core materials are shown, any suitable number of types of core materials may be used.

The difference in charge/discharge voltage potential with respect to $Li^+/Li$ between the electrode active materials, such first and second electrode active materials 16 and 17, may be about 0.1 volts (V) or greater. For example, difference in charge/discharge voltage potential with respect to $Li^+/Li$ between the electrode active materials may be about 0.4V. For example, a difference in charge/discharge voltage potential with respect to $Li^+/Li$ between a Si active material and a Sn active material is about 0.4 V. Since the electrode active materials have a difference of 0.1 V or greater in charge/discharge voltage potential with respect to $Li^+/Li$ potential therebetween, electrochemical reactions may take place at different voltages and thus may be dispersed rather than intensively taking place at a single, given voltage. Thus, a lithium battery including the composite electrode active material including the plurality of electrode active materials may have excellent charge/discharge characteristics such as rate properties and lifespan characteristics.

The electrode active materials may each independently have a specific capacity of about 200 milliampere hours per gram (mAh/g) or greater. For example, the electrode active materials may each independently have a specific capacity of about 200 mAh/g to about 4200 mAh/g. For example, the electrode active materials may each independently have a specific capacity of about 400 mAh/g to about 4200 mAh/g. For example, the electrode active materials may each independently have a specific capacity of about 400 mAh/g to about 4000 mAh/g.

For example, the electrode active materials may each independently comprise Si and at least one element selected from a Group 14 element, except for Si, and a transition metal oxide.

For example, the electrode active materials may each independently comprise Si and at least one selected from Sn, Ge, $Fe_3O_4$, and $Co_3O_4$.

For example, the first and second electrode active materials 16 and 17 may be Si and Sn, respectively.

Since the volume of silicon generally expands by as much as about 300% during intercalation and deintercalation of lithium ions, silicon may be used in various forms such as a silicon powder having a nano- or micro-particle size, a silicon nanocomposite, or a silicon nanowire to reduce the volumetric expansion. Alternatively, silicon is used in a silicon-graphite composite form.

By combining the excellent lithium storage capability of silicon and the excellent electrical conductivity and mechanical properties of graphite, the silicon-graphite composite may inhibit a decrease in the energy density of graphite and prevent a lifespan decrease due to volumetric changes of silicon during intercalation and deintercalation of lithium.

However, the silicon-graphite composite causes mechanical strains due to the repeated volumetric changes of silicon. In addition, since intercalation of lithium is performed at charge/discharge voltage potentials of about 0.5 V and about 0.1 V with respect to Li+/Li in the silicon-graphite composite, electrochemical reactions intensively take place at these voltages. Thus, the silicon-graphite composite may have reduced durability, and the lithium battery including the silicon-graphite composite may have deteriorated charge/discharge characteristics such as rate properties and lifespan characteristics.

Since the composite electrode active material according to an embodiment includes Si and at least one selected from Sn, Ge, $Fe_3O_4$, and $Co_3O_4$, a high capacity may be obtained and durability may be improved by designing the electrochemical reactions to take place at various charge/discharge voltage potential with respect to $Li^+/Li$ as well as at 0.5 V and 0.1 V. Thus, the lithium battery including the composite electrode active material 10 may have excellent charge/discharge characteristics such as rate properties and lifespan characteristics.

For example, the electrode active materials may include Si, Sn, or a combination thereof. Tin (Sn) is a high capacity electrode active material having a theoretical capacity of about 1000 mAh/g or greater, and electrochemical reactions take place at a charge/discharge voltage potential of about 0.9 V with respect to $Li^+/Li$. Thus, electrochemical reactions also take place at about 0.9 V as well as at about 0.5 V and about 0.1 V in a composite electrode active material including these electrode active materials, thereby improving durability. Thus, a lithium battery including the composite electrode active material may achieve high capacity more efficiently and have excellent charge/discharge characteristics such as rate properties and lifespan characteristics.

The electrode active materials may be comprised of a plurality of particles and may include micropores between the plurality of particles. For example, the plurality of particles may be primary particles or secondary particles formed by aggregation of the primary particles together. The pore channels may have voids in portions thereof. Structures of the electrode active materials in the pore channels may be identified by field-emission scanning microscopy (FE-SEM) and energy dispersive spectroscopy (EDS), which will be described later.

The micropores and voids may prevent mechanical stress caused by the volumetric expansion of the plurality of particles of the electrode active materials from being transferred to the carbon nanostructure shell during charging. Thus, the composite electrode active material including the electrode active materials may have excellent structural stability. The lithium battery including the composite electrode active material may have excellent charge/discharge characteristics such as rate properties and lifespan characteristics.

The composite electrode active material may include at least two pore channels. For example, composite electrode active material may include a first pore channel including a first core material including a first electrode active material and a second core material comprising a second electrode active material. The first electrode active material has a charge/discharge voltage potential with respect to Li+/Li which is different from a charge/discharge voltage potential with respect to Li+/Li of the second electrode active material. An average particle diameter ratio between the first electrode active material and the second electrode active material having different charge/discharge voltage potentials with respect to Li$^+$/Li, and respectively disposed in the first and second pore channels, may be in the range of about 1:1 to about 1:10. For example, the average particle diameter ratio between the first electrode active material and the second electrode active material having different charge/discharge voltage potential with respect to Li$^+$/Li and respectively disposed in the first and second pore channels, may be in the range of about 1:1 to about 1:9, for example, in the range of about 1:1 to about 1:8, for example, in the range of about 1:1 to about 1:7, for example, in the range of about 1:1 to about 1:6, for example, in the range of about 1:1 to about 1:5, and for example, in the range of about 1:1 to about 1:4.

The "average particle diameter" or "average particle diameter D50" or "average particle size," refers to a particle diameter D50 corresponding to 50% of the total number of particles in a distribution curve in which particles are accumulated in the order of particle diameter from the smallest particle to the largest particle and a total number of accumulated particles is 100%. The average particle diameter D50 may be measured using methods well known in the art, for example, using a particle size analyzer or a transmission electron microscopic (TEM), high-resolution transmission electron microscopic (HR-TEM), scanning electron microscopic (SEM), or a field-emission scanning microscopic (FE-SEM) image. Alternatively, the average particle diameter D50 may be determined via dynamic light-scattering, which includes counting the number of particles within predetermined size ranges, and calculating the average particle diameter D50 therefrom.

A weight ratio of the first electrode active material and the second electrode active material having different charge/discharge voltage potentials with respect to Li+/Li and respectively disposed in the first and second pore channels, may be in the range of about 1:1 to about 1:99. For example, the weight ratio of the first electrode active material to the second electrode active material may be in the range of about 1:1 to about 1:80, for example, in the range of about 1:1 to about 1:70, for example, in the range of about 1:1 to about 1:60, for example, in the range of about 1:1 to about 1:50, for example, in the range of about 1:1 to about 1:40, for example, in the range of about 1:1 to about 1:30, for example, in the range of about 1:1 to about 1:20, for example, in the range of about 1:1 to about 1:10, for example, in the range of about 1:1 to about 1:8, for example, in the range of about 1:1 to about 1:5, and for example, in the range of about 1:1 to about 1:3.

When the average particle diameter ratio and/or the weight ratio of the first and the second electrode active materials, having different charge/discharge voltage potentials with respect to Li$^+$/Li and respectively disposed in the first and second pore channels are within these ranges, mechanical stress caused by volumetric expansion of the electrode active materials may be reduced due to the appropriate volume and amount of the electrode active materials. Thus, charge/discharge characteristics such as rate properties and lifespan characteristics of the lithium battery may further be improved.

The pore channels may each have an average diameter in the range of about 100 nanometers (nm) to about 5 micrometers (μm). For example, the core may have an average diameter in the range of about 100 nm to about 4 μm, for example, in the range of about 100 nm to about 3 μm, for example, in the range of about 100 nm to about 2 μm, and for example, in the range of about 1 μm to about 2 μm.

The carbon nanostructure may be a carbon nanofiber.

An average diameter of the carbon nanofiber may be in a range of about 1 nanometer to about 1 μm, or in the range of about 1 nm to about 500 nm, or in the range of about 1 nm to about 50 nm.

An average aspect ratio of the carbon nanofiber may be in the range of about 2 to about 10,000, for example, in the range of about 2 to about 8,000, for example, in the range of about 2 to about 6,000, for example, in the range of about 2 to about 4,000, for example, in the range of about 2 to about 2,000, for example, in the range of about 2 to about 1,000, for example, in the range of about 2 to about 800, for example, in the range of about 2 to about 600, for example, in the range of about 2 to about 400, for example, in the range of about 2 to about 200, for example, in the range of about 2 to about 100, for example, in the range of about 2 to about 80, for example, in the range of about 2 to about 60, for example, in the range of about 2 to about 40, for example, in the range of about 2 to about 20, for example, in the range of about 2 to about 10, and for example, in the range of about 2 to about 5.

As used herein, the term "average aspect ratio" refers to a ratio of measured average length to a measured average diameter.

The average aspect ratio may be measured using methods known in the art, for example, using a TEM, HR-TEM, SEM, or FE-SEM image and/or a device which measures via dynamic light-scattering. The average aspect ratio may be obtained by dividing a mean value of the measured lengths by a mean value of the measured diameters.

When the average diameter of the carbon nanofiber is within the above-described ranges, sufficient mechanical strength may be obtained. When the average aspect ratio of the carbon nanofiber is within the above-described ranges, charges may be quickly transferred from the surface of the electrode active material into the inside thereof.

The carbon nanostructure shell may have a thickness of about 10 nm to about 1 μm, for example, about 10 nm to about 500 nm, for example, about 20 nm to about 500 nm.

The composite electrode active material may further include a conductive material. The conductive material may include at least one selected from carbon nanotube, graphene, carbon black, acetylene black, and Ketjen black.

The composite electrode active material may further include a binder.

The binder may be at least one selected from an organic binder and an aqueous binder.

Examples of the organic binder include at least one selected from a vinylidene fluoride/hexafluoropropylene copolymer, polyvinylidene fluoride, polyacrylonitrile, polymethyl methacrylate, polytetrafluoroethylene (PTFE), and a styrene butadiene rubber polymer.

Examples of the aqueous binder include at least one selected from polyvinyl alcohol, polyacrylic acid, polyacrylic acid substituted with an alkali cation or an ammonium ion, polyimide, polyamideimide, polyvinylidene fluoride, carboxymethyl cellulose, carboxymethyl cellulose sodium salt, carboxymethyl cellulose ammonium salt, methyl cellulose, hydroxyl methyl cellulose, hydroxyl propyl cellulose, ethyl cellulose, diacetyl cellulose, polytetrafluoroethylene, polyethylene, and polypropylene.

The amount of the binder may be in the range of about 1 part by weight to about 50 parts by weight, or from about 2 parts by weight to about 50 parts by weight, or from about 10 parts by weight to about 50 parts by weight, based on 100 parts by weight of the composite electrode active material. When the composite electrode active material includes the binder in the amount within this range, a lithium battery including the composite electrode active material including the binder may have excellent charge/discharge characteristics such as lifespan characteristics.

The composite electrode active material, the conductive material, and the binder may be used in any amount suitable for a lithium battery. For example, a weight ratio of the composite electrode active material to the conductive material and the binder may be in the range of about 98:2 to about 92:8, or from about 80:20 to about 20:80, or from about 74:25 to about 25:75, and a weight ratio of the conductive material to the binder may be in the range of about 1:1 to about 1:3, or from about 1:1 to about 1:2, or from about 1:1 to about 1:1.5, without being limited thereto.

The carbon nanostructure shell may further include an amorphous carbonaceous coating layer on the surface thereof.

Since the amorphous carbonaceous coating layer is formed on the surface of the carbon nanostructure shell, charge/discharge characteristics may further be improved.

Lithium Battery

A lithium battery according to another embodiment includes: a cathode; an anode including the aforementioned composite electrode active material; and an electrolyte disposed between the cathode and the anode.

The lithium battery may include a lithium ion battery, a lithium sulfur battery, or a lithium air battery.

The cathode may be prepared as follows. A cathode active material, a conductive material, a binder, and a solvent are mixed to prepare a cathode slurry composition. The cathode slurry composition is directly coated on a cathode current collector and dried to prepare a cathode plate on which a cathode active material layer is formed. Alternatively, the cathode slurry composition is cast on a separate support, and a film separated from the support is laminated on a cathode current collector to prepare a cathode plate on which a cathode active material layer is formed.

The cathode active material is not limited and may be any lithium-containing metal oxide suitable for use in a lithium battery. For example, a composite oxide of lithium and a metal selected from at least one of cobalt, manganese, and nickel, may be any the following formulae: $Li_aA_{1-b}B'_bD'_2$ (where $0.90 \leq a \leq 1$, and $0 \leq b \leq 0.5$); $Li_aE_{1-b}B'_bO_{2-c}D'_c$ (where $0.90 \leq a \leq 1$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cD'_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; and $LiFePO_4$.

In the formulae above, A is at least one selected from Ni, Co, and Mn; B' is at least one selected from Al, Ni, Co, Mn, Cr, Fe, Mg, Sr, V, and a rare earth element; D' is at least one selected from O, F, S, and P; E is at least one selected from Co and Mn; F' is at least one selected from F, S, and P; G is at least one selected from Al, Cr, Mn, Fe, Mg, La, Ce, Sr, and V; Q is at least one selected from Ti, Mo, and Mn; I' is at least one selected from Cr, V, Fe, Sc, and Y; and J is at least one selected from V, Cr, Mn, Co, Ni, and Cu.

The compounds listed above may have a coating layer on the surface thereof or a mixture of a compound with no coating layer and a compound having a coating layer may also be used. The coating layer may include a compound of a coating element, such as an oxide, hydroxide, oxyhydroxide, oxycarbonate, or hydroxycarbonate of the coating element. The compound constituting the coating layer may be amorphous or crystalline. Examples of the coating element contained in the coating layer may include at least one selected from Mg, Al, Co, K, Na, Ca, Si, Ti, V, Sn, Ge, Ga, B, As, Zr, or a mixture thereof. The coating layer may be formed on the compound any suitable method which does not adversely affect the physical properties of the cathode active material (e.g., spray coating and immersing). These methods are known and thus detailed descriptions thereof are not provided herein.

The conductive material may be at least one selected from carbon black, particulate graphite particulate, natural graphite, artificial graphite, acetylene black, and Ketjen black; carbon fiber; carbon nanotube; a metal such as copper, nickel, aluminum, and silver, each of which may be used in powder, metal fiber, or metal tube form; and a conductive polymer such as a polyphenylene derivative. However, the conductive material is not limited thereto, and any material suitable for use as a conductive material may also be used.

Examples of the binder may include at least one selected from a vinylidene fluoride/hexafluoropropylene copolymer, polyvinylidene fluoride, polyacrylonitrile, polymethylmethacrylate, PTFE, and a styrene butadiene rubber polymer. Examples of the solvent include at least one selected from N-methylpyrrolidone (NMP), acetone, and water, without being limited thereto. Any known suitable solvent may also be used.

As desired, a plasticizer may further be added to the cathode slurry composition to form pores in the electrode plate.

The amounts of the cathode active material, the conductive material, the binder, and the solvent may be determined by one of skill in the art without undue experimentation. At least one of the conductive material, the binder, and the solvent may be not used according to use and structure of lithium secondary batteries.

The cathode current collector may have a thickness of about 3 μm to about 500 μm. The cathode current collector may be any current collector that does not cause a chemical change in a fabricated battery and which has conductivity. Examples of the cathode current collector include at least one selected from copper, stainless steel, aluminum, nickel, titanium, calcined carbon, copper or stainless steel surface-treated with carbon, nickel, titanium or silver, and an aluminum-cadmium alloy. In addition, the cathode current collector may be processed to have fine irregularities on the surface thereof so as to enhance adhesiveness of the cathode current collector to the cathode active material, and may be used in any of various forms including films, sheets, foils, nets, porous structures, foams, and non-woven fabrics.

A mixture for the cathode may have a density of 2 grams per cubic centimeter (g/cc) or greater.

The anode may be prepared as follows. The anode may be prepared in the same manner as the cathode, except that an anode active material is used instead of a cathode active material. In addition, the conductive material, the binder, and the solvent used to prepare the cathode may also be used in the anode slurry composition.

For example, an anode active material, a binder, and a solvent, and selectively a conductive material, are mixed to prepare an anode slurry composition. The anode slurry composition is directly coated on an anode current collector to prepare an anode plate. Alternatively, the anode slurry composition is cast on a separate support, and an anode active material film separated from the support is laminated on an anode current collector to prepare an anode plate.

The anode active material may be the composite electrode active material 10 previously described. In addition, the anode active material may also include any other suitable anode active material which may be used to prepare lithium secondary batteries in addition to the composite electrode active material 10. For example, the anode active material may include at least one of lithium metal, a metal alloyable with lithium, transition metal oxides, non-transition metal oxides, and carbonaceous materials.

For example, the metal alloyable with lithium may be at least one selected from Si, Sn, Al, Ge, Pb, Bi, Sb, an Si—Y' alloy (where Y' is at least one selected from an alkali metal, an alkali earth metal, a Group 13 element, a Group 14 element, a transition metal, and a rare earth element, except for Si), and an Sn—Y' alloy (where Y' is at least one selected from an alkali metal, an alkali earth metal, a Group 13 element, a Group 14 element, a transition metal, and a rare earth element, except for Sn). In this regard, Y' may be at least one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, and Po.

For example, the transition metal oxide may be at least one selected from lithium titanium oxide, vanadium oxide, lithium vanadium oxide, and the like.

For example, the non-transition metal oxide may be at least one selected from $SnO_2$, $SiO_x$ (0<x<2), and the like.

The carbonaceous material may include at least one selected from crystalline carbon and amorphous carbon. Examples of the crystalline carbon include natural graphite or artificial graphite that are in a particle, plate, flake, spherical, or fibrous form. Examples of the amorphous carbon include at least one selected from soft carbon (carbon calcined at low temperature), hard carbon, mesophase pitch carbides, calcined corks, and the like.

The anode active material, the conductive material, the binder, and the solvent may be used in amounts commonly used in lithium secondary batteries.

The anode current collector may have a thickness of about 3 to about 500 μm. The anode current collector may be any current collector that does not cause a chemical change in the battery and which has conductivity. Examples of the anode current collector include at least one selected from copper, stainless steel, aluminum, nickel, titanium, calcined carbon, copper or stainless steel surface-treated with carbon, nickel, titanium or silver, and aluminum-cadmium alloys. In addition, the anode current collector may be processed to have fine irregularities on the surface thereof so as to enhance adhesiveness of the cathode current collector to the anode active material, and may be used in any of various forms including films, sheets, foils, nets, porous structures, foams, and non-woven fabrics.

The cathode and the anode may be separated from each other by a separator. Any separator that is suitable for lithium secondary batteries may be used. Particularly, a separator that has low resistance to migration of ions of an electrolyte and excellent electrolytic solution-retaining ability may be used. Examples of the separator may include at least one selected from glass fiber, polyester, Teflon, polyethylene, polypropylene, and PTFE, each of which may be a nonwoven fabric or a woven fabric. The separator has a pore diameter of about 0.01 to about 10 μm and a thickness of about 5 to about 300 μm.

A lithium salt-containing non-aqueous electrolyte is composed of a non-aqueous electrolyte solution and lithium. As the non-aqueous electrolyte, a non-aqueous electrolyte solution, an organic solid electrolyte, or an inorganic solid electrolyte may be used.

Examples of the non-aqueous electrolyte solution may include any aprotic organic solvent such as N-methyl-2-pyrrolidone, propylene carbonate, ethylene carbonate, butylene carbonate, dimethyl carbonate, diethyl carbonate, gamma-butyro lactone, 1,2-dimethoxyethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte may include at least one selected from a polyethylene derivative, a polyethylene oxide derivative, a polypropylene oxide derivative, a phosphoric acid ester polymer, poly-L-lysine, polyester sulfide, polyvinyl alcohol, polyvinylidene fluoride, and a polymer containing ionic dissociation groups.

Examples of the inorganic solid electrolyte may include at least one selected from a nitride, halide, or sulfate of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, and Li$_3$PO$_4$—Li$_2$S—SiS$_2$.

Any lithium salt suitable for use as an electrolyte in a lithium secondary battery may be used. The lithium salt is a material that is readily soluble in the non-aqueous electrolyte and may include at least one selected from LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic carboxylic acid lithium, lithium tetraphenyl borate, and an imide.

Lithium secondary batteries may be classified into lithium ion secondary batteries, lithium ion polymer secondary batteries, and lithium polymer secondary batteries, according to the types of the separator and the electrolyte. In addition, lithium secondary batteries may be classified into a cylindrical type, a rectangular type, a coin type, and a pouch type according to the shape of the battery, and may also be classified into a bulk type and a thin film type according to the size of the battery.

Methods of preparing these batteries may be determined by one of skill in the art without undue experimentation, and thus detailed descriptions thereof are not provided herein.

Figure 8:
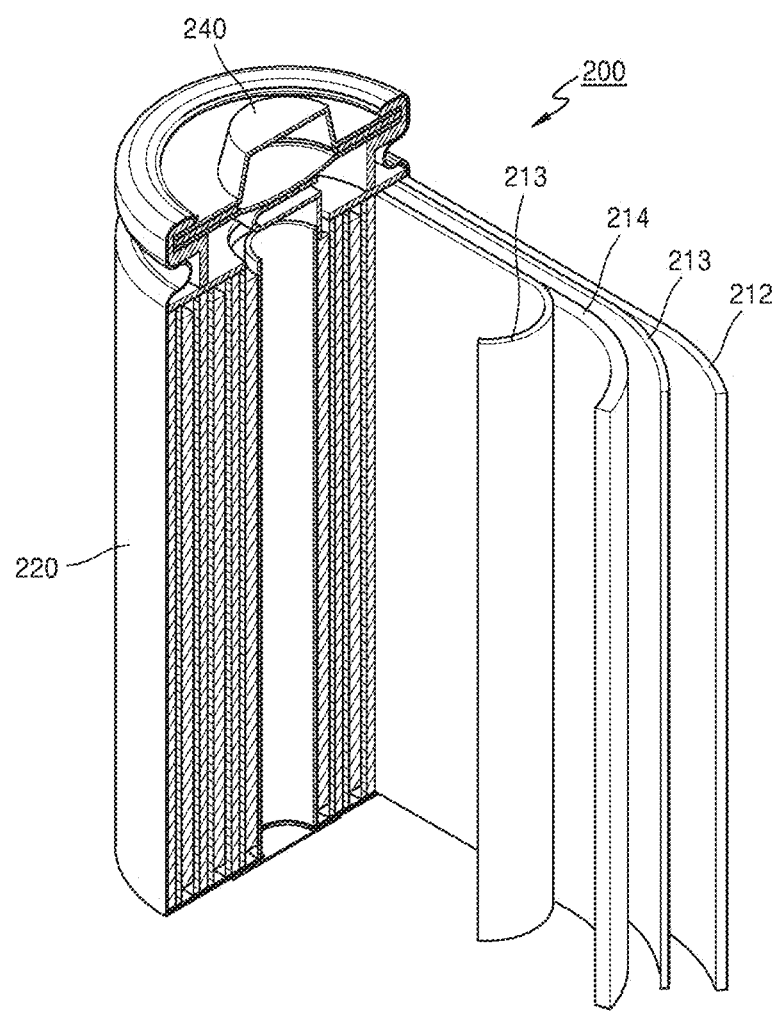
FIG. 8 is a schematic diagram illustrating a structure of a lithium secondary battery according to an embodiment.

FIG. 8 is a schematic diagram illustrating a structure of a lithium secondary battery according to an embodiment.

As illustrated in FIG. 8, a lithium secondary battery 200 includes a cathode 214, a separator 213, and an anode 212. The cathode 214, the separator 213, and the anode 212 of the lithium secondary battery 200 as described above, are wound or folded and then accommodated in a battery case 220. Then, an organic electrolyte solution is injected into the battery case 220, and the battery case 220 is sealed by a sealing member 240, thereby completing the manufacture of the lithium secondary battery 200. The battery case 220 may have a cylindrical shape, a rectangular shape, or a thin-film shape. For example, the lithium secondary battery 200 may be a large-sized thin film battery. The lithium secondary battery 200 may be, for example, a lithium ion secondary battery.

Meanwhile, the separator may be interposed between the cathode and the anode to form a battery assembly. When the battery assembly is stacked in a bi-cell structure, impregnated with the organic electrolyte solution, and the resultant is inserted into a pouch and sealed, preparation of a lithium ion polymer battery is completed.

Also, a plurality of battery assemblies may be stacked to form a battery pack, which may be used in any device for which high capacity and high output as desired, for example, in laptop computers, smart phones, electric tools, and electric vehicles.

In addition, the lithium secondary battery may be suitable for use as power sources of an electric vehicle (EV) due to excellent storage stability at high temperatures, excellent lifespan characteristics, and high rate properties. For example, the lithium secondary battery may be applied to a hybrid electric vehicle such as a plug-in hybrid electric vehicle (PHEV).

Although the composite electrode active material 10 is used herein as an anode active material in the lithium secondary battery, the composite electrode active material 10 may also be used as a cathode active material in a lithium sulfur secondary battery.

Preparation Method of Composite Electrode Active Material

A method of preparing a composite electrode active material according to another embodiment includes: preparing a carbon nanostructure shell precursor solution; preparing a first sacrificial material-electrode active material core solution by mixing a sacrificial material with a first electrode active material solution including a first electrode active material; preparing a second sacrificial material-electrode active material core solution by mixing the sacrificial material solution with a second electrode active material solution comprising a second electrode active material; supplying the carbon nanostructure shell precursor solution, the first sacrificial material-electrode active material core solution, and the second sacrificial material-electrode active material core solution into an electrospinning apparatus; and heat-treating the mixture. The first electrode active material has a charge/discharge voltage potential with respect to Li+/Li which is different from a charge/discharge voltage potential with respect to Li+/Li of the second electrode active material. The method is not limited to a first electrode active material solution and a second electrode active material solution, and may include any additional number of electrode active material solutions according to the desired number of different electrode active materials to be included in the composite electrode active material. Each additional electrode active material solution may be separately mixed with the sacrificial material to prepare different sacrificial material-electrode active material core solutions.

First, the carbon nanostructure shell precursor solution is prepared. The carbon nanostructure shell precursor solution is prepared by combining a carbon nanostructure shell precursor with a solvent. The carbon nanostructure shell precursor may include a nitrile-based (e.g. a nitrile-containing) polymer or copolymer.

For example, the carbon nanostructure shell precursor may include polyacrylonitrile, or the like. For example, a weight average molecular weight of the polyacrylonitrile may be in the range of about 10,000 grams per mole (g/mol) to about 500,000 g/mol, for example, in the range of about 50,000 g/mol to about 500,000 g/mol, for example, in the range of about 100,000 g/mol to about 500,000 g/mol, for example, in the range of about 100,000 g/mol to about 400,000 g/mol, and for example, in the range of about 100,000 g/mol to about 300,000 g/mol.

When the weight average molecular weight of polyacrylonitrile is within the above-described ranges, polyacrylonitrile may have a viscosity which is suitable for forming the carbon nanostructure shell, thereby suitable as a precursor to be carbonized. The solvent for the carbon nanostructure shell precursor solution may be an organic solvent such as N,N-dimethylformamide (DMF).

Then, the at least two (e.g. first and second) sacrificial material-electrode active material core solutions are prepared. For example, a first sacrificial material solution is mixed a first electrode active material solution including a first electrode active material and the sacrificial material solution mixed with a second electrode active material solution including a second electrode active material. The first electrode active material has a charge/discharge voltage potential with respect to Li+/Li which is different from a charge/discharge voltage potential with respect to Li+/Li of the second electrode active material.

The sacrificial material may include at least one of a nitrile-based polymer, an acryl polymer, and a copolymer thereof.

Examples of the sacrificial material may include at least one of styrene-co-acrylonitrile, poly(methyl methacrylate), and the like. A weight average molecular weight of the sacrificial material (e.g. styrene-co-acrylonitrile or poly(methyl methacrylate)) may be in the range of about 10,000 g/mol to about 500,000 g/mol, for example, in the range of about 50,000 g/mol to about 500,000 g/mol, for example, in the range of about 100,000 g/mol to about 500,000 g/mol, for example, in the range of about 100,000 g/mol to about 400,000 g/mol, for example, in the range of about 100,000 g/mol to about 300,000 g/mol, and for example, in the range of about 100,000 g/mol to about 200,000 g/mol.

When the weight average molecular weight of the sacrificial material is within the ranges above, the sacrificial material may have a viscosity which is suitable for stable degradation. Also, pore channels may be formed in the carbon nanostructure shell and may have a suitable moderate pore size, for example, an average pore diameter in the range of about 100 nm to about 5 µm. The solvent may be an organic solvent such as DMF.

The first and second electrode active materials having different charge/discharge voltage potentials with respect to $Li^+/Li$ may include Si and at least one selected from Sn, Ge, $Fe_3O_4$, and $Co_3O_4$, respectively. For example, the first and second electrode active materials may include Si and Sn, respectively.

A weight ratio of the sacrificial material to the electrode active material may be in the range of about 100:1 to about 1:100 in each of the first and second sacrificial material-electrode active material core solutions. For example, the weight ratio of the sacrificial material to the electrode active material may be in the range of about 50:1 to about 1:50, for example, in the range of about 20:1 to about 1:20, and for example, in the range of about 5:1 to about 1:5 in each of the first and second sacrificial material-electrode active material core solutions.

When the weight ratio of the sacrificial material to the electrode active material is within the above-described ranges in each of the first and second sacrificial material-electrode active material core solutions, the size of pores formed in the carbon nanostructure shell may be efficiently controlled.

Then, the carbon nanostructure shell precursor solution, the first sacrificial material-electrode active material core solution, and the second sacrificial material-electrode active material core solution are supplied into the electrospinning apparatus and heat-treated to prepare the composite electrode active material.

In the electrospinning apparatus, a difference in the flow rates between a sacrificial material-electrode active material core solutions and a carbon nanostructure shell precursor solution may be in the range of about 0 to about 100 milliliters per hour (mL/h). For example, the difference in flow rates between the sacrificial material-electrode active material core solution and the carbon nanostructure shell precursor solution may be in the range of about 0 to about 50 mL/h and for example, in the range of about 0 to about 30 mL/h, in the electrospinning apparatus.

When the difference in the flow rates between the sacrificial material-electrode active material core solution and the carbon nanostructure shell precursor solution in the electrospinning apparatus is within these ranges, a desired structure of the composite electrode active material, in which at least two pore channels are formed in a carbon nanostructure shell, may be accurately formed.

The heat-treatment may be performed under atmospheric conditions or in an inert atmosphere at a temperature of about 400° C. or higher, or for example about 500° C. or higher, or for example, about 800° C. or higher, or for example, about 1000° C. or higher. For example, the mixture may be maintained under atmospheric conditions at a temperature in the range of about 300° C. to about 400° C. for about 30 minutes to about 2 hours. Then, the mixture is heated and maintained in an inert atmosphere, e.g., in a nitrogen atmosphere, at a temperature in the range of about 400° C. to about 2000° C., for example about 500° C. to about 1500° C., or from about 800° C. to about 1200° C., for about 30 minutes to about 2 hours. The sacrificial material may be easily removed by simultaneously stabilizing the carbon nanostructure shell and performing carbonization throughout the heat-treatment.

Hereinafter, one or more embodiments will be described in detail with reference to the following examples. These examples are not intended to limit the purpose and scope of the one or more embodiments of the present disclosure.

EXAMPLES

Example 1: Preparation of Composite Electrode Active Material

20% by weight of polyacrylonitrile (PAN, Mw: 200,000 g/mol, manufactured by Mitsui Chemical), as a carbon nanofiber shell precursor, was dissolved in DMF (purity: 99.5%, manufactured by Daejung Chemical) to prepare a PAN shell precursor solution.

1 g of Si nanoparticles (average diameter: 110 nm, standard deviation: 49 nm, manufactured by Aldrich) was added to DMF and sonicated for about 3 hours to prepare a Si solution.

1 g of Sn nanoparticles (average diameter: 50 nm, standard deviation: 5 nm, manufactured by Aldrich) was added to DMF and sonicated for about 3 hours to prepare a Sn solution.

3 g of styrene-co-acrylonitrile (SAN, 28.5 mol % AN; Mw: 120,000 g/mol, manufactured by Cheil Industries), as a sacrificial material, was added to each of the Si solution and the Sn solution, and the mixtures were stirred at about 80° C. for about 5 hours to prepare an SAN-Si core solution and an SAN-Sn core solution.

The PAN shell precursor solution is horizontally injected into a coaxial electrospinning apparatus equipped with a vertical dual nozzle (applied voltage: 18 kV, tip-to-collector distance (TCD): 15 cm, flow rate of the core solutions: 0.5 mL/h, and flow rate of the shell solution: 1.25 mL/h), while the SAN-Si core solution and the SAN-Sn core solution were vertically injected into the dual nozzle.

The resultant was maintained at a temperature in the range of about 270° C. to about 300° C. for about 1 hour under atmospheric conditions, heated at a heating rate of about 10° C./min, and maintained at about 1000° C. for about 1 hour in a nitrogen atmosphere. As a result, a composite electrode active material having a structure in which two cores (average diameter: about 1 to about 2 µm) formed as pore channels in a carbon nanofiber shell (average diameter of the nanofiber: about 1 µm, average length of the nanofiber: about 50 µm, and average thickness of the shell: about 50 nm), in which a weight ratio of the Si active material to the Sn active material is 1:1.

Comparative Example 1: Preparation of Composite Electrode Active Material

A Si solution and an Sn solution not including the sacrificial material (styrene-co-acrylonitrile (SAN, 28.5 mol % AN; Mw: 120,000 g/mol, manufactured by Cheil Industries) were prepared.

A composite electrode active material having a structure in which the Si active material and the Sn active material were mixed in a weight ratio of 1:1 in the carbon nanofiber (average diameter: about 1 μm and average length: about 50 μm) was prepared in the same manner as in Example 1, except that a mixture solution of the Si solution, the Sn solution, and the PAN precursor solution was supplied into an electrospinning apparatus (applied voltage: 18 kV, TCD: 15 cm, and flow rate of the mixture solution: 0.5 mL/h) equipped with a single nozzle.

Comparative Example 2: Preparation of Composite Electrode Active Material

A composite electrode active material having a structure in which two cores (average diameter: about 1 to about 2 μm) were formed as pore channels in the carbon nanofiber shell (average diameter of the nanofiber: about 1 μm, average length of the nanofiber: about 50 μm, and average thickness of the shell: about 50 nm) and the Si active material is disposed in the pore channels, was prepared in the same manner as in Example 1, except that the Si core solution is respectively vertically injected into the dual nozzle of the coaxial electrospinning apparatus (applied voltage: 18 kV, TCD: 15 cm, flow rate of the core solutions: 0.5 mL/h, and flow rate of the shell solution: 1.25 mL/h) equipped with the vertical dual nozzle, instead of vertically injecting the SAN-Si core solution and the SAN-Sn core solution into the dual nozzle.

Comparative Example 3: Preparation of Composite Electrode Active Material

A composite electrode active material having a structure in which two cores (average diameter: about 1 to about 2 μm) were formed as pore channels in the carbon nanofiber shell (average diameter of the nanofiber: about 1 μm, average length of the nanofiber: about 50 μm, and average thickness of the shell: about 50 nm) and the Sn active material is disposed in the pore channels, was prepared in the same manner as in Example 1, except that the Sn core solution is respectively vertically injected into the dual nozzle of the coaxial electrospinning apparatus (applied voltage: 18 kV, TCD: 15 cm, flow rate of the core solutions: 0.5 mL/h, and flow rate of the shell solution: 1.25 mL/h) equipped with the vertical dual nozzle, instead of vertically injecting the SAN-Si core solution and the SAN-Sn core solution into the dual nozzle.

Example 2: Preparation of Lithium Secondary Battery (Coin Cell)

The composite electrode active material prepared according to Example 1, carbon black, and polyamideimide (PAI) were dissolved in NMP in a solid content mixing ratio of 7:2:1 to prepare an anode active material slurry.

The anode active material slurry was coated on a 10 μm-thick Cu foil by bar coating to a thickness of 30 μm and dried. The dried slurry was further dried in a vacuum at 200° C. for about 4 hours to prepare an anode plate. The anode plate was pressed using a roll press to prepare a sheet-shaped anode for a coin cell. In this case, a capacity of the anode was about 1000 mAh/g.

A coin half cell (CR2032 type) having a diameter of 12 mm was prepared using the anode. In the preparation of the coin half cell (CR2032 type), lithium metal was used as a counter electrode, and a 1.0 M LiP Fe solution prepared using a mixed solvent including ethylene carbonate (EC) and diethylene carbonate (DEC) in a volume ratio of 5:5 was used as an electrolyte.

Comparative Examples 4 to 6: Preparation of Lithium Secondary Battery (Coin Cell)

Coin lithium half cells (CR2032 type) were prepared in the same manner as in Example 2, except that the composite electrode active materials prepared according to Comparative Examples 1 to 3 were used instead of the composite electrode active material according to Example 1.

Analysis Example 1: FE-SEM Analysis—Morphological Analysis of Composite Electrode Active Material FE-SEM analysis was performed on the composite electrode active materials prepared according to Example 1 and Comparative Example 1. The FE-SEM analysis was performed using a JSM-7600F manufactured by JEOL. The results are shown in FIGS. 3A and 3B.

Figure 3A:
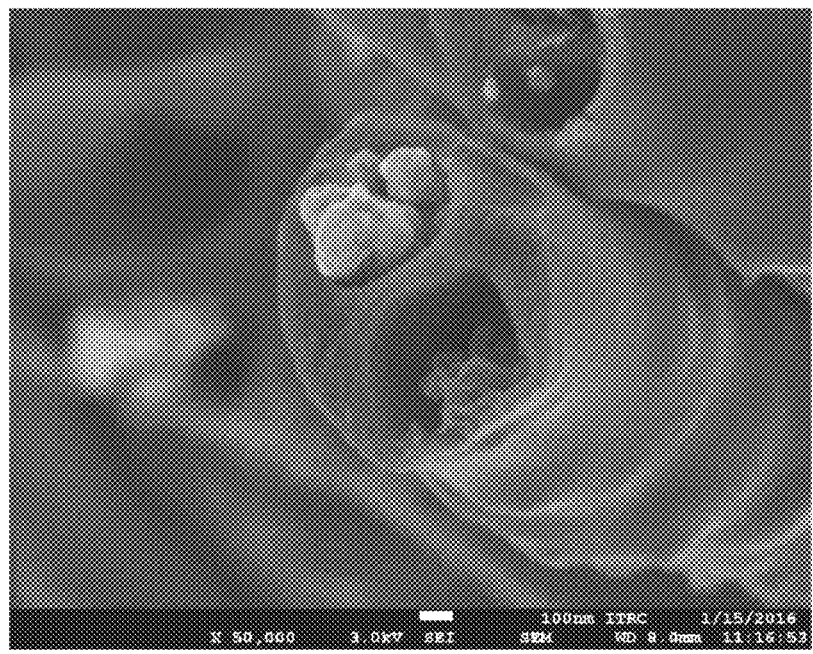
FIGS. 3A and 3B are field-emission scanning microscopy (FE-SEM) images of composite electrode active materials prepared according to Example 1 and Comparative Example 1.

Referring to FIG. 3A, the composite electrode active material according to Example 1 includes two cores formed within pore channels in a carbon nanofiber shell, and the cores respectively include the electrode active materials. It was confirmed that the electrode active materials are formed of particles and that micropores are present between the particles.

Figure 3B:
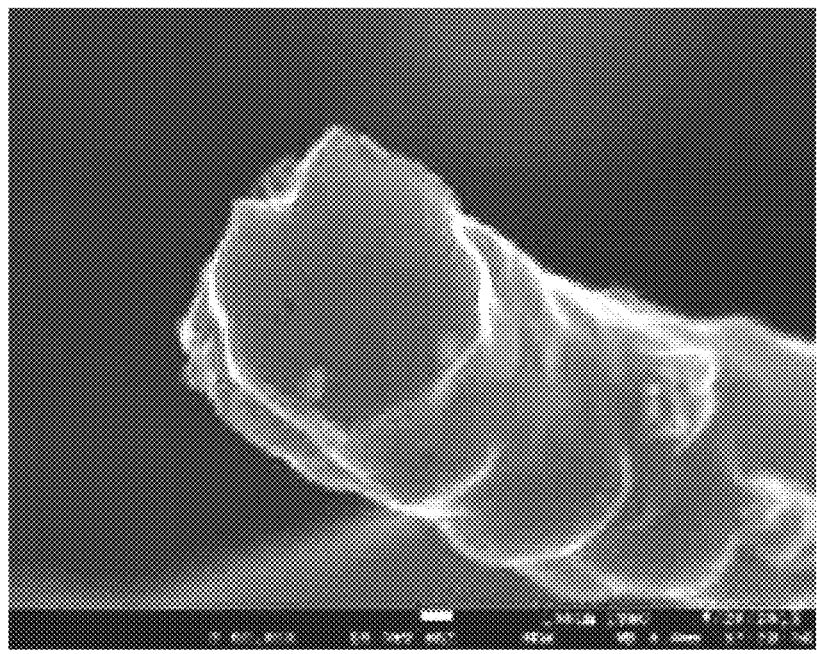

Referring to FIG. 3B, it was confirmed that the electrode active materials are filled in the carbon nanofiber shell in the composite electrode active material according to Comparative Example 1.

Analysis Example 2: EDS Analysis—Component Analysis of Composite Electrode Active Material The composite electrode active material according to Example 1, and tin (Sn), silicon (Si), and carbon (C) in the composite electrode active material were respectively analyzed by EDS. The EDS was performed using an S-4700 by Hitachi. The results are shown in FIGS. 4A to 4D, respectively.

Figure 4A:
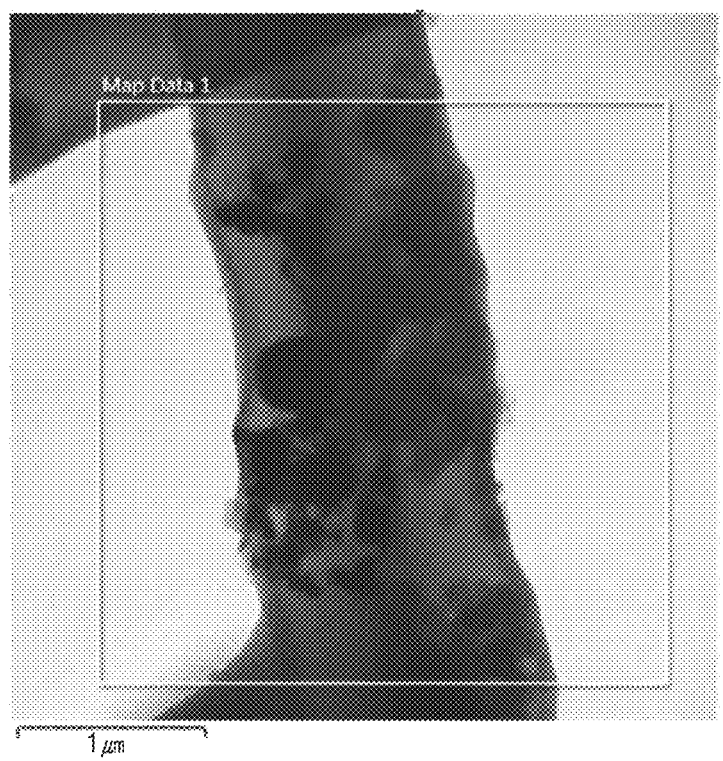
Figure 4B:
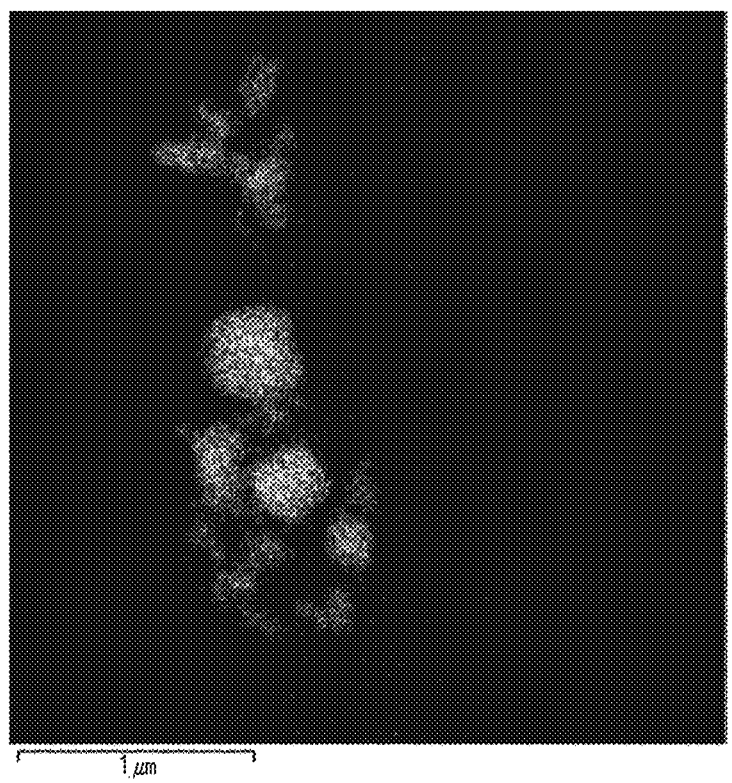
Figure 4C:
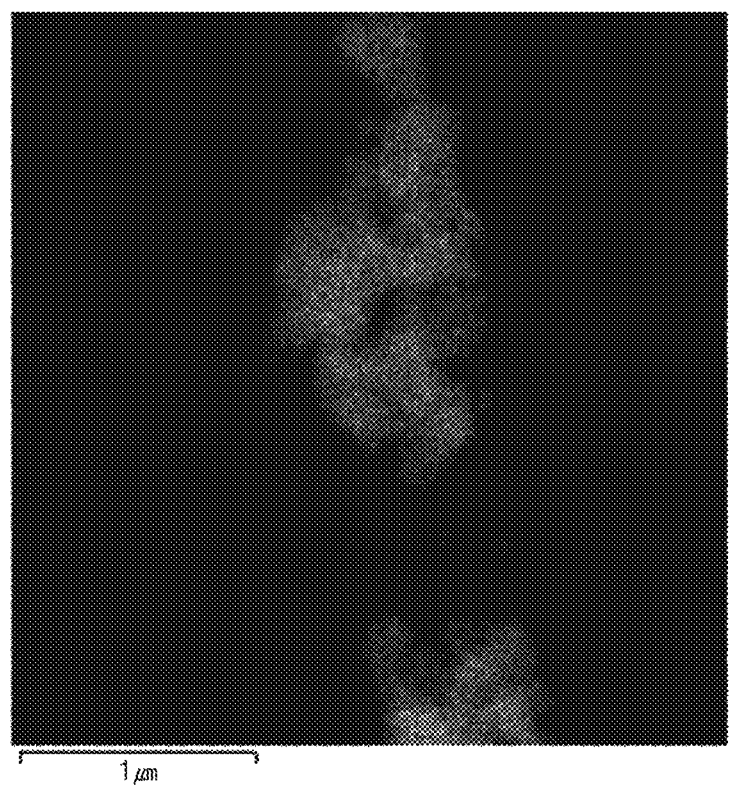
Figure 4D:
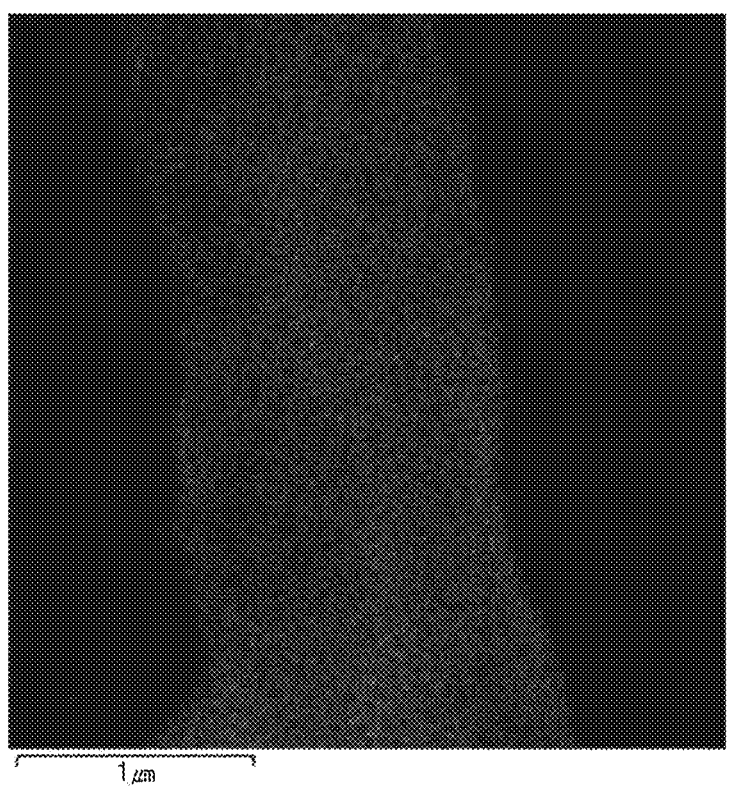

Referring to FIGS. 4A to 4D, the entire structure of the composite electrode active material according to Example 1 is shown in FIG. 4A as a reference. It was confirmed that tin (Sn) shown as dots in the photograph of FIG. 4B is dispersed in a left pore channel, silicon (Si) shown as dots in the photograph of FIG. 4C is dispersed in a right pore channel, and voids are partially dispersed in the pore channels. It was also confirmed that carbon (C), shown as dots in the photograph of FIG. 4D, is dispersed throughout the entire structure of the composite electrode active material.

Analysis Example 3: WAXD Analysis—Structure Analysis of Composite Electrode Active Material Wide-angle X-ray diffraction (WAXD) analysis was performed on the composite electrode active materials prepared according to Example 1 and Comparative Examples 2 and 3.

The WAXD analysis was performed by scanning at a rate of 1°/min in a 2θ range between 20° to 80° using wide-angle CuK- alpha X-rays (wavelength: 1.541 Å, New D8 Advance, manufactured by Bruker). The results are shown in FIGS. 5A to 5C.

Figure 5A:
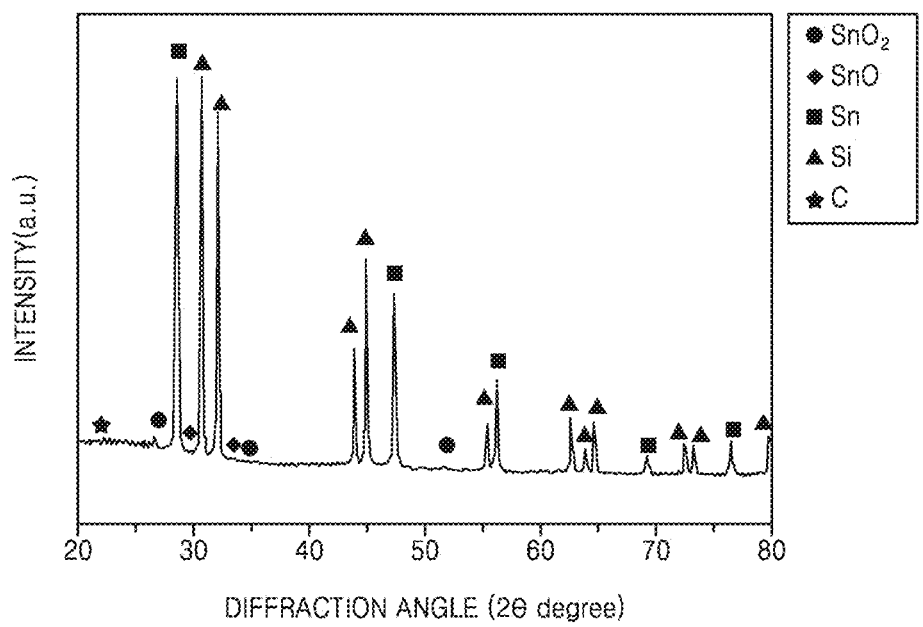
FIGS. 5A to 5C are graphs illustrating intensity (arbitrary units, a.u.) versus diffraction angle (degrees 2-theta, 2Θ), which shows wide-angle X-ray diffraction (WAXD) analysis results for the composite electrode active materials prepared according to Example 1 (FIG. 5A) and Comparative Examples 2 (FIG. 5B) and 3 (FIG. 5C)
Figure 5B:
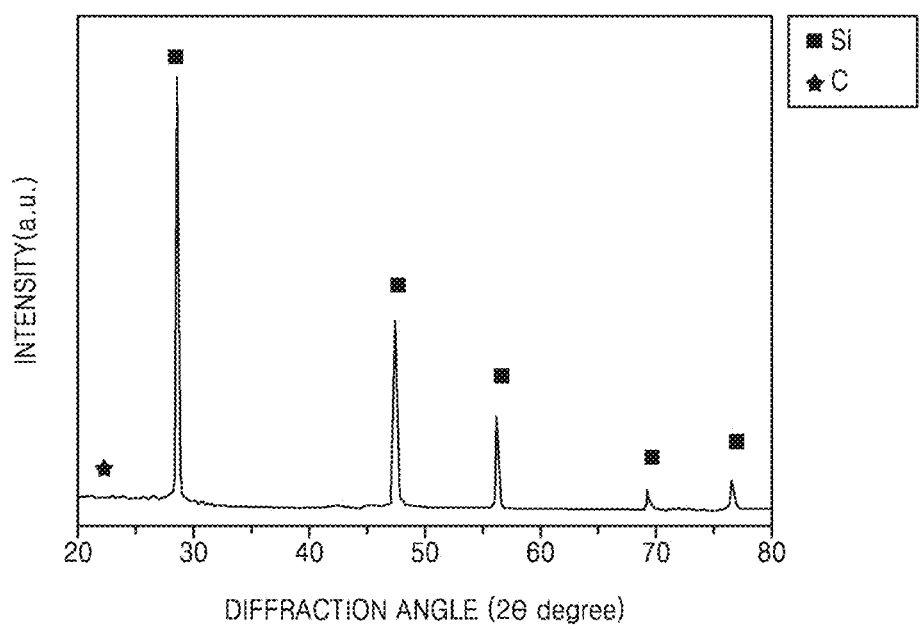
Figure 5C:
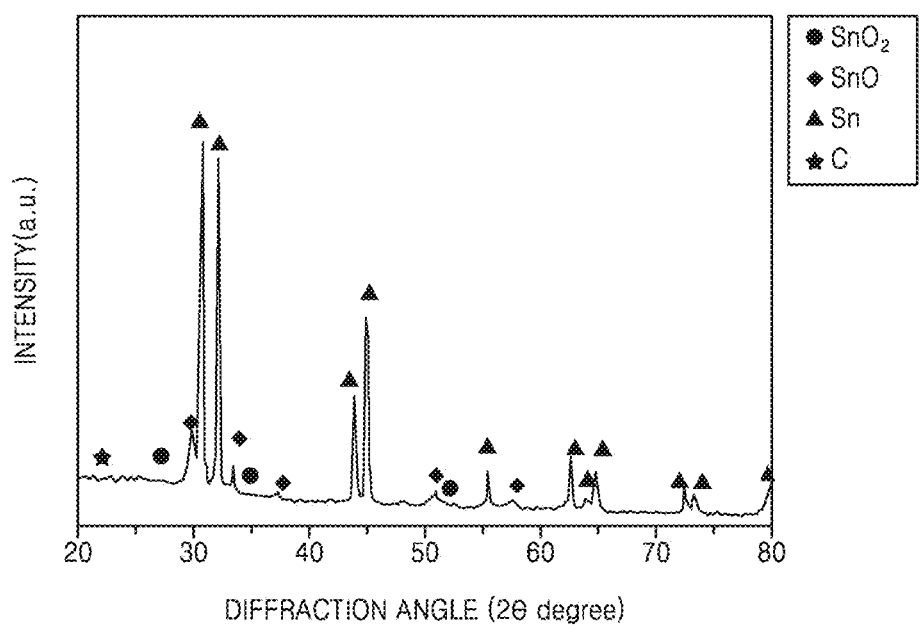

Referring to FIGS. 5A to 5C, peaks of components $SnO_2$, SnO, Sn, Si, and C in the composite electrode active material according to Example 1 were observed. In the case of the composite electrode active material according to Comparative Example 2, peaks of components Si and C were observed. In the case of the composite electrode active material according to Comparative Example 3, peaks of components SnO$_2$, SnO, Sn, and C were observed.

Evaluation Example 1: Charge and Discharge Test—Evaluation of Rate Property and Lifespan Characteristics A charge and discharge test was performed on the lithium secondary batteries prepared according to Example 2 and Comparative Examples 4 to 6 at room temperature (25° C.).

Evaluation Example 1-1: Evaluation of Rate Property

The lithium secondary batteries were charged and discharged once (1st cycle) with a constant current of 0.1 C (100 milliampere per gram, mA/g) between voltages of 0.01 and 1.5 V (vs. Li/Li$^+$), in which 1,000 mA/g was calculated as 1 C.

The charging (intercalation of Li$^+$) and discharging (deintercalation of Li$^+$) were repeated 5 times, and the lithium secondary batteries were rested for 10 minutes (rest time) between the charging and discharging.

Then, each of the lithium secondary batteries was discharged at a constant current rate of 0.2 C (200 mA/g) and charged at a constant current rate of 0.1 C (100 mA/g) from the 1st to the 5th cycles, at a constant current rate of 0.2 C (200 mA/g) from the 6th to the 10th cycles, at a constant current rate of 0.5 C (500 mA/g) from the 11th to the 15th cycles, at a constant current rate of 1 C (1,000 mA/g) from the 16th to the 20th cycles, at a constant current rate of 5 C (5,000 mA/g) from the $21^{st}$ to the 25th cycles, at a constant current rate of 10 C (10,000 mA/g) from the $26^{th}$ to the $30^{th}$ cycles, and at a constant current rate of 0.1 C (100 mA/g) from the $31^{st}$ to the $35^{th}$ cycles to measure charge capacities. The results are shown in FIG. 6.

Figure 6:
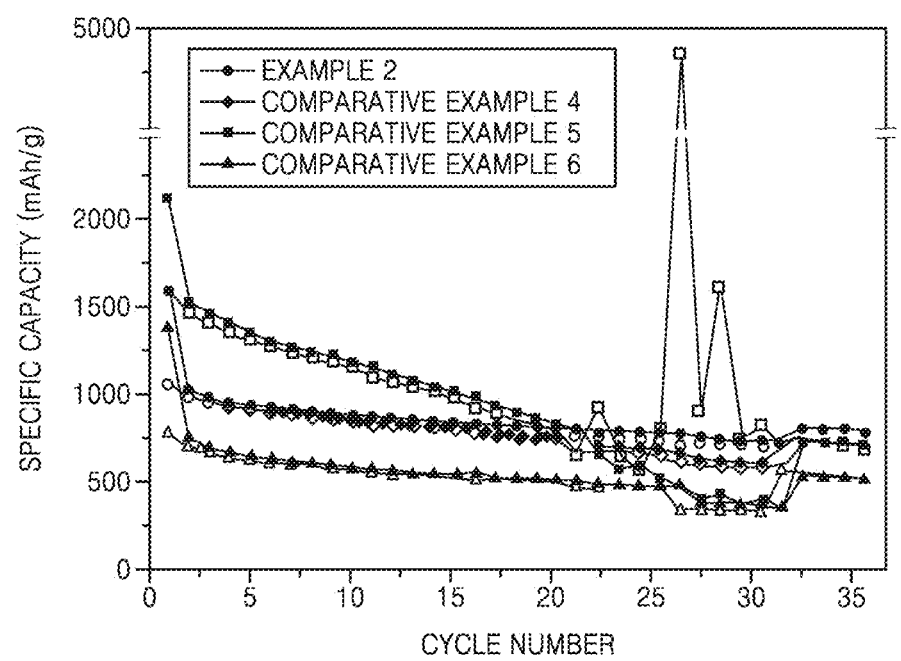
FIG. 6 is a graph illustrating specific capacity (milliampere per gram, mAh/g) versus cycle number, which shows rate properties of the lithium secondary batteries prepared according to Example 2 and Comparative Examples 4 to 6.

Referring to FIG. 6, the charge capacity of the lithium secondary battery according to Example 2 was higher than those of the lithium secondary batteries according to Comparative Examples 4 to 6. Thus, it may be confirmed that rate properties of the lithium secondary battery according to Example 2 were better than those of the lithium secondary batteries according to Comparative Examples 4 to 6.

Evaluation Example 1-2: Evaluation of Lifespan Characteristics

The lithium secondary batteries were repeatedly charged and discharged 100 times with a constant current of 0.1 C (100 mA/g) between voltages of 0.01 and 1.5 V (vs. Li/Li$^+$), in which 1,000 mA/g was calculated as 1 C. Discharge capacities thereof were measured at the 100th cycle. The results are shown in FIG. 7.

Figure 7:
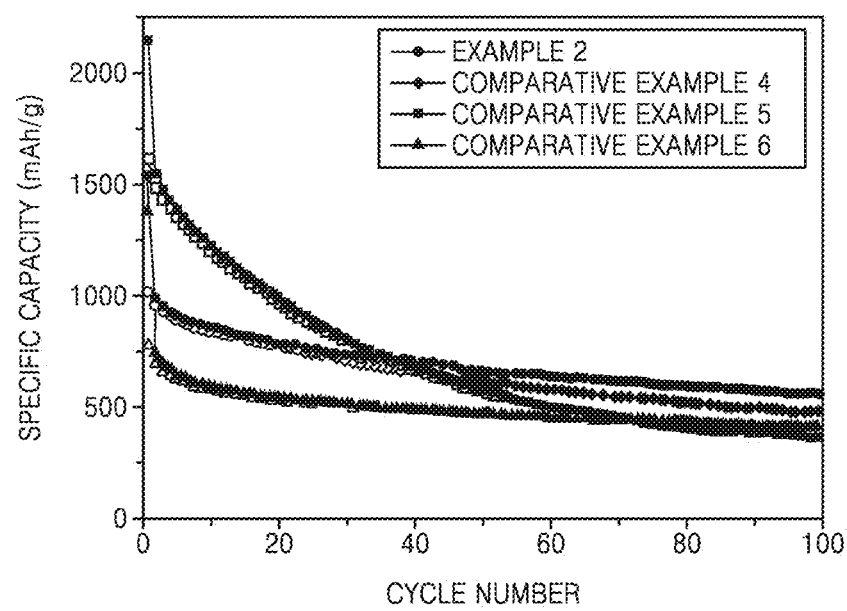
FIG. 7 is a graph illustrating specific capacity versus cycle number, which shows lifespan characteristics of lithium secondary batteries prepared according to Example 2 and Comparative Examples 4 to 6.

Referring to FIG. 7, the discharge capacity of the lithium secondary battery according to Example 2 was higher than those of the lithium secondary batteries according to Comparative Examples 4 to 6. As a result, it was confirmed that lifespan characteristics of the lithium secondary battery according to Example 2 were better than those of the lithium secondary batteries according to Comparative Examples 4 to 6.

Since the composite electrode active material according to an embodiment of the present disclosure includes at least two cores formed as pore channels in the carbon nanostructure shell, and the cores include at least two electrode active materials having different charge/discharge voltages with respect to Li+/Li potential, charge/discharge characteristics such as rate properties and lifespan characteristics may be improved.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite electrode active material comprising:
a carbon nanostructure shell;
a first core material disposed in a first pore channel defined in the carbon nanostructure shell; and
a second core material disposed in a second pore channel defined in the carbon nanostructure shell,
wherein the first pore channel and the second pore channel are disposed in a same carbon nanostructure shell and are aligned in a length direction of the carbon nanostructure shell,
wherein the first core material comprises a first electrode active material and the second core material comprises a second electrode active material, and
wherein the first electrode active material has a charge/discharge voltage potential with respect to Li$^+$/Li which is different from a charge/discharge voltage potential of the second electrode active material with respect to Li$^+$/Li.

2. The composite electrode active material of claim 1, wherein the first pore channel further comprises the second core material.

3. The composite electrode active material of claim 1, wherein the second pore channel further comprises the first core material.

4. The composite electrode active material of claim 1, wherein a difference between the charge/discharge voltage potential with respect to Li+/Li of the first electrode active material and the charge/discharge voltage potential with respect to Li+/Li of the second electrode active material is 0.1 volts or greater.

5. The composite electrode active material of claim 1, wherein the first electrode active material and the second electrode active material each have a specific capacity of 200 milliampere hours per gram or greater.

6. The composite electrode active material of claim 1, wherein the first electrode active material is Si and the second electrode active material comprises at least one selected from a Group 14 element, except for Si, and a transition metal oxide.

7. The composite electrode active material of claim 1, wherein the first electrode active material comprises Si and the second electrode active material comprises Sn.

8. The composite electrode active material of claim 7, wherein the first electrode active material is Si and the second electrode active material comprises at least one selected from Sn, Ge, Fe$_3$O$_4$, and Co$_3$O$_4$.

9. The composite electrode active material of claim 1, wherein each of the first electrode active material and the second electrode active material are in the form of particles, and micropores are present between the particles.

10. The composite electrode active material of claim 1, wherein a portion of the first pore channel has a void and a portion of the second pore channel has a void.

11. The composite electrode active material of claim 1, wherein
an average particle diameter ratio of the first electrode active material to the second electrode active material is in a range of about 1:1 to about 1:10.

12. The composite electrode active material of claim 1, wherein a weight ratio of the first electrode active material to the second electrode active material is in a range of about 1:1 to about 1:99.

13. The composite electrode active material of claim 1, wherein the first pore channel and the second pore channel each independently have an average diameter in a range of about 100 nanometers to about 5 micrometers.

14. The composite electrode active material of claim 1, wherein the carbon nanostructure comprises a carbon nanofiber.

15. The composite electrode active material of claim 1, wherein the carbon nanostructure shell has a thickness in a range of about 10 nanometers to about 1 micrometer.

16. The composite electrode active material of claim 1, wherein the composite electrode active material further comprises a conductive material.

17. The composite electrode active material of claim 1, wherein the carbon nanostructure shell further comprises an amorphous carbonaceous coating layer on a surface thereof.

18. A lithium battery comprising:
a cathode;
an anode comprising a composite electrode active material; and
an electrolyte disposed between the cathode and the anode,
wherein the composite electrode active material comprises:
a carbon nanostructure shell;
a first core material disposed in a first pore channel defined in the carbon nanostructure shell; and
a second core material disposed in a second pore channel defined in the carbon nanostructure shell,
wherein the first pore channel and the second pore channel are disposed in a same carbon nanostructure shell and are aligned in a length direction of the carbon nanostructure shell,
wherein the first core material comprises a first electrode active material and the second core material comprises a second electrode active material, and
wherein the first electrode active material has a charge/discharge voltage potential with respect to Li+/Li which is different from a charge/discharge voltage potential of the second electrode active material with respect to Li+/Li.

19. A method of preparing a composite electrode active material, the method comprising:
preparing a carbon nanostructure shell precursor solution;
preparing a first sacrificial material-electrode active material core solution by mixing a sacrificial material solution with a first electrode active material solution comprising a first electrode active material;

preparing a second sacrificial material-electrode active material core solution by mixing the sacrificial material solution with a second electrode active material solution comprising a second electrode active material;
supplying the carbon nanostructure shell precursor solution, the first sacrificial material-electrode active material core solution, and the second sacrificial material-electrode active material core solution into an electrospinning apparatus; and
heat-treating the mixture to prepare the composite electrode active material,
wherein the composite electrode material comprises:
a carbon nanostructure shell;
a first core material disposed in a first pore channel defined in the carbon nanostructure shell; and
a second core material disposed in a second pore channel defined in the carbon nanostructure shell,
wherein the first pore channel and the second pore channel are disposed in a same carbon nanostructure shell and are aligned in a length direction of the carbon nanostructure shell,
wherein the first core material comprises the first electrode active material and the second core material comprises the second electrode active material, and
wherein the first electrode active material has a charge/discharge voltage potential with respect to Li+/Li which is different from a charge/discharge voltage potential of the second electrode active material with respect to Li+/Li.

20. The method of claim 18, wherein the carbon nanostructure precursor solution comprises a nitrile-containing polymer or a nitrile-containing copolymer.

21. The method of claim 18, wherein the sacrificial material comprises at least one of a nitrile-containing polymer, an acryl-polymer, and a copolymer thereof.

22. The method of claim 18, wherein the first electrode active material comprises Si and the second electrode active material comprises at least one selected from Sn, Ge, $Fe_3O_4$, and $Co_3O_4$.

23. The method of claim 21, wherein a weight ratio of the sacrificial material to the first electrode active material is in a range of about 20:1 to about 1:20 in the first sacrificial material-electrode active material core solution, and
wherein a weight ratio of the sacrificial material to the second electrode active material is in a range of about 20:1 to about 1:20 in the second sacrificial material-electrode active material core solution.

24. The method of claim 18, wherein a difference between a flow rate of the first electrode sacrificial material electrode active material core solution and a flow rate of the carbon nanostructure shell precursor solution, and a difference between a flow rate of the second electrode sacrificial material electrode active material core solution and the flow rate of the carbon nanostructure shell precursor solution, are in a range of about 0 to about 100 milliliters per hour in the electro spinning apparatus.

25. The method of claim 18, wherein the heat-treating is performed at 400° C. or higher under atmospheric conditions or in an inert atmosphere.

* * * * *